United States Patent
Wang (10) Patent No.: US 10,755,476 B2
(45) Date of Patent: Aug. 25, 2020

(54) IMAGE PROCESSING METHOD AND IMAGE PROCESSING DEVICE

(71) Applicant: INSTITUTE FOR INFORMATION INDUSTRY, Taipei (TW)

(72) Inventor: Shang-Ming Wang, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 16/198,984

(22) Filed: Nov. 23, 2018

(65) Prior Publication Data

US 2020/0082609 A1   Mar. 12, 2020

(30) Foreign Application Priority Data

Sep. 11, 2018  (TW) .............................. 107131918 A (51) Int. Cl.
| | | |
|---|---|---|
| *G06T 15/60* | (2006.01) | |
| *G06T 5/50* | (2006.01) | |
| *G06T 5/00* | (2006.01) | |
| *G06K 9/00* | (2006.01) | |

(52) U.S. Cl.
CPC .......... *G06T 15/60* (2013.01); *G06K 9/00248* (2013.01); *G06T 5/008* (2013.01); *G06T 5/50* (2013.01); *G06T 2207/30201* (2013.01)

(58) Field of Classification Search
CPC ....... G06T 15/60; G06T 2215/12; G06T 7/73; G06T 5/008; G06T 5/50; G06T 2207/30201; G06K 9/00228; G06K 9/00248

See application file for complete search history.

(56) References Cited

U.S. PATENT DOCUMENTS

| | | | | |
|---|---|---|---|---|
| 6,091,836 A | * | 7/2000 | Takano | G06K 9/00268 382/118 |
| 2015/0117789 A1 | * | 4/2015 | Miyashita | G06K 9/4604 382/201 |
| 2019/0080149 A1 | * | 3/2019 | Gernoth | G06K 9/00255 |

FOREIGN PATENT DOCUMENTS

| | | |
|---|---|---|
| TW | 200707310 A | 8/1994 |
| TW | I432881 B | 4/2014 |

OTHER PUBLICATIONS

Georghiades et al., From Few to Many: Illumination Cone Models for Face Recognition under Variable Lighting and Pose, IEEE Transactions on Pattern Analysis and Machine Intelligence, vol. 23, No. 6, Jun. 2001, pp. 643-660 (Year: 2001).*
Taiwanese Office Action and Search Report, dated Oct. 30, 2019, for Taiwanese Application No. 107131918.

* cited by examiner

*Primary Examiner* — Haixia Du
(74) *Attorney, Agent, or Firm* — Birch, Stewart, Kolasch & Birch, LLP (57) ABSTRACT

An image processing method and an image processing device are provided. The image processing method includes the following steps. A light source is projected onto a 3D model via a plurality of projecting locations to generate a plurality of facial shadow pictures. The facial shadow pictures are superimposed to generate a composite shadow picture. An eye-eyebrow location, a nose location and a mouth location in a 2D facial map are obtained by way of analyzing according to the composite shadow picture. A plurality of characteristic points are calculated according to the eye-eyebrow location, the nose location and the mouth location in the 2D facial map.

18 Claims, 6 Drawing Sheets

IMAGE PROCESSING METHOD AND IMAGE PROCESSING DEVICE

This application claims the benefit of Taiwan application Serial No. 107131918, filed Sep. 11, 2018, the subject matter of which is incorporated herein by reference.

BACKGROUND OF THE INVENTION

Field of the Invention

The invention relates in general to a processing method and a processing device, and more particularly to an image processing method and an image processing device.

Description of the Related Art

With the evolution of image processing technology, a face synthesizing technology has been developed. The human face synthesizing technology can synthesize one human face onto another face. The human face synthesizing technology can be applied to products, such as virtual reality (VR), augmented reality (AR), mixed reality (MR), animation, movies and the like.

In the human face synthesizing technology, the most important issue is the need of obtaining the representative facial feature characteristic. Conventionally, the user has to manually select the characteristic point. However, the artificial selection of the characteristic point has the too low accuracy, and the facial synthesis result tends to get distorted. In addition, if the selection of the characteristic point is trained by way of machine learning, a lot of computation resources need to be spent. Thus, the selection of the characteristic point forms a great bottleneck in the facial synthesis technology.

More particularly, when the human face synthesizing technology is applied to the 3D facial model and the accuracy is too low, the distortion condition becomes more serious. In addition, the computation resources for the human face synthesizing technology applied to the 3D facial model become huger. If the spending of the computation resources cannot be effectively reduced, it is difficult to apply the human face synthesizing technology to the 3D facial model.

SUMMARY OF THE INVENTION

The invention relates to an image processing method and an image processing device that use different projecting locations to generate different shadows, and thereby automatically calculate the facial characteristic points. In the human face synthesizing technology, the invention can be used to improve the precision of selecting the characteristic points, and increase the image processing speed.

According to a first aspect of the invention, an image processing method is provided. The image processing method includes the following steps. A light source is projected onto a 3D model via a plurality of projecting locations to generate a plurality of facial shadow pictures. The facial shadow pictures are superimposed to generate a composite shadow picture. An eye-eyebrow location, a nose location and a mouth location in a 2D facial map are obtained by way of analyzing according to a contour boundary pattern. A plurality of characteristic points are calculated according to the eye-eyebrow location, the nose location and the mouth location in the 2D facial map.

According to a second aspect of the invention, an image processing device is provided. The image processing device includes a processor. The processor is used to perform an image processing method, and the image processing method includes the following steps. A plurality of facial shadow pictures are superimposed to generate a composite shadow picture. The facial shadow pictures are generated by projecting a light source onto a 3D model via a plurality of projecting locations. An eye-eyebrow location, a nose location and a mouth location in a 2D facial map are obtained by way of analyzing according to a contour boundary pattern. A plurality of characteristic points are calculated according to the eye-eyebrow location, the nose location and the mouth location in the 2D facial map.

The above and other aspects of the invention will become better understood with regard to the following detailed description of the preferred but non-limiting embodiments. The following description is made with reference to the accompanying drawings.

DETAILED DESCRIPTION OF THE INVENTION

The technical features of the invention are described in detail hereinbelow with reference to the embodiment, which is not intended to limit the scope of the invention. In the image processing method of this embodiment utilizes a light source providing different projecting locations to generate different shadows so that the facial characteristic points are automatically calculated. In the human face synthesizing technology, the invention can be utilized to enhance the precision of selecting the characteristic point and increase the image processing speed.

Figure 1:
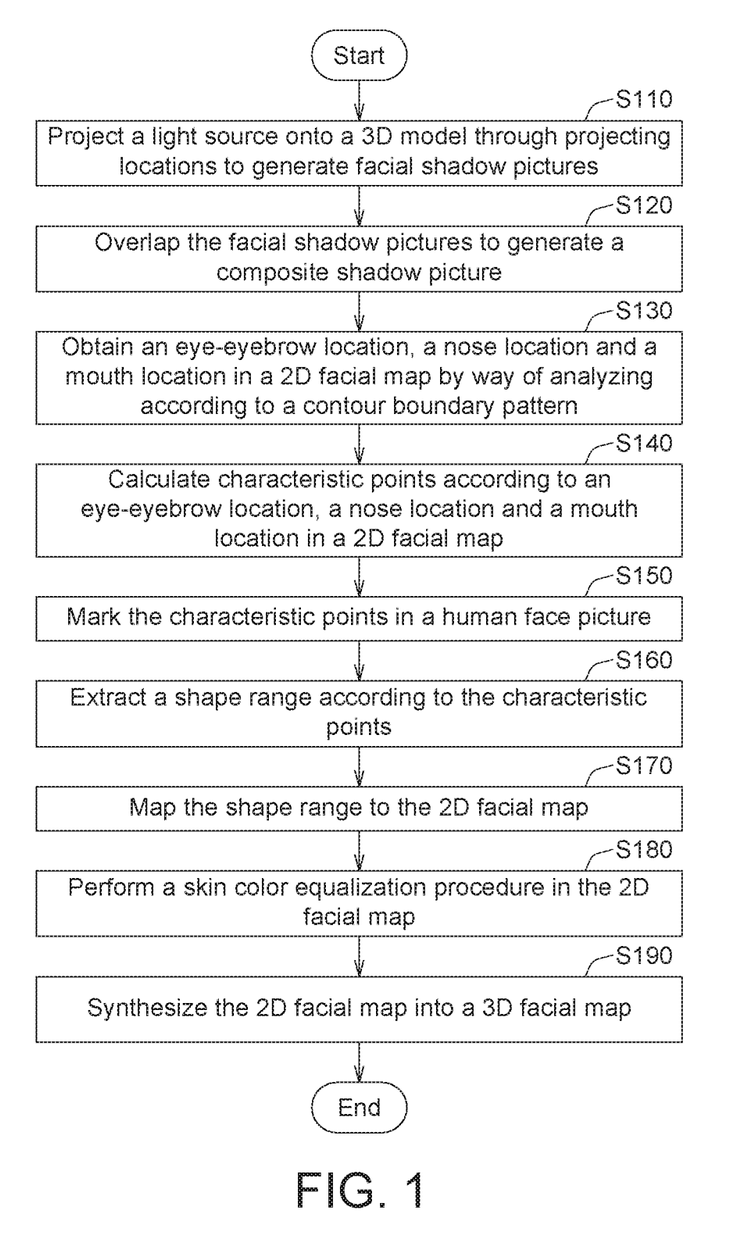
FIG. 1 is a flow chart showing an image processing method according to one embodiment.

FIG. 1 is a flow chart showing an image processing method according to one embodiment. Referring to FIG. 1, in this embodiment, the automatic calculation of characteristic points is performed through steps S110 to S140 in order to facilitate subsequent various image processing procedures, which are, for example, procedures for synthesizing pictures into a 3D facial model in steps S150 to S190. An image processing method in this embodiment can be performed by a processor 110 (see FIG. 2) of an image processing device 100 (see FIG. 2). The image processing device 100 is, for example, a computer, a server, a cluster computing system, an edge computing system, or a cloud computation center.

Figure 2:
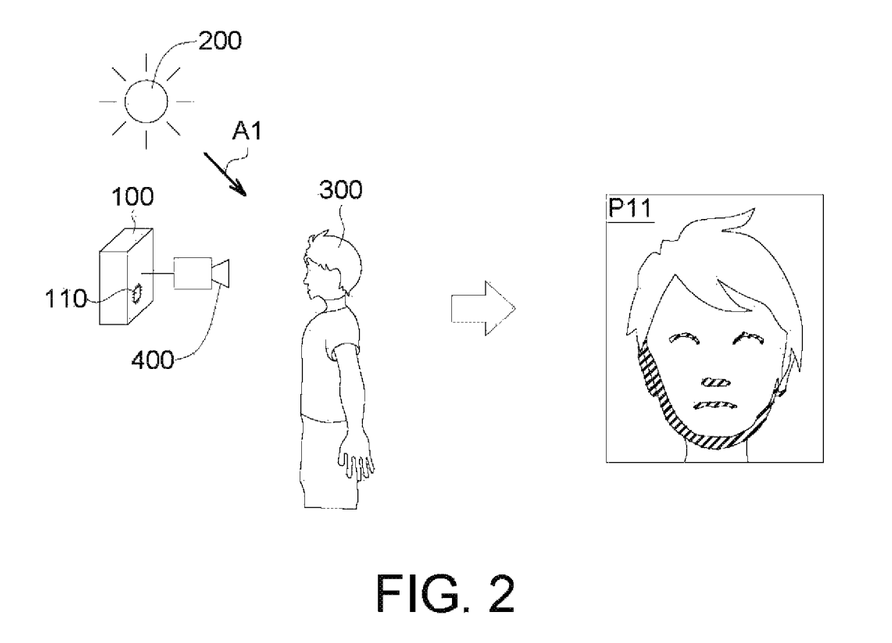
FIGS. 2 and 3 are schematic views showing a step S110.
Figure 3:
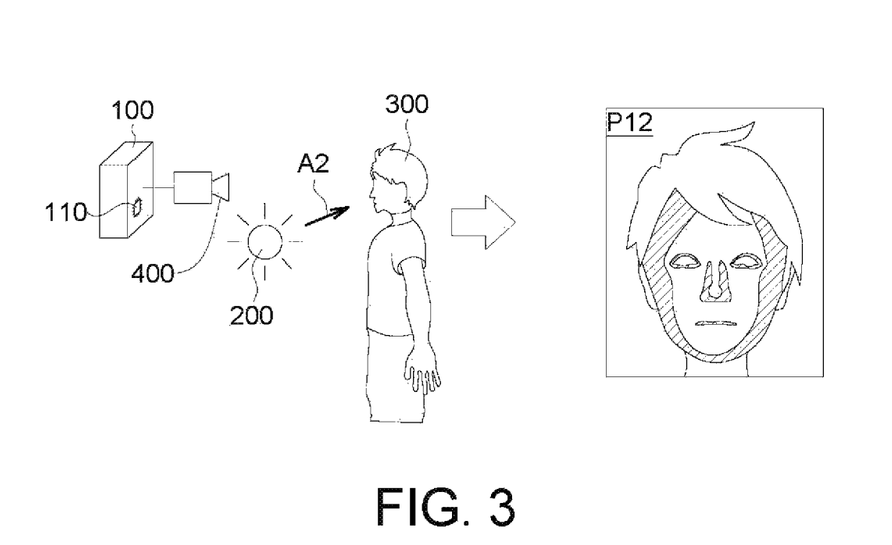

FIGS. 2 and 3 are schematic views showing the step S110. Referring to FIGS. 2 and 3, in the step S110, a light source 200 is projected onto a 3D model 300 via a plurality of projecting locations A1 and A2 to enable a camera 400 to generate a plurality of facial shadow pictures P11 and P12.

In this embodiment, because the projecting locations A1 and A2 are different from each other, shadows rendered by the facial shadow pictures P11 and P12 are different from each other. The projecting locations A1 and A2 may be an upper front, a lower front, a front left or a front right of the 3D model 300. The designer may design appropriate directions and locations to make the shadows rendered by the facial features in the 3D model 300 more complete. For example, the projecting location A1 in FIG. 2 is the upper front at an angle of 45 degrees, and the projecting location A2 in FIG. 3 is the lower front at an angle of 15 degrees. In an embodiment, the number of the facial shadow pictures can be greater than two, and more facial shadow pictures can make the shadows rendered by the facial features more complete.

The 3D model 300 may be a 3D human facial model or a real person. The shadow of the 3D model 300 may truly indicate the relative location and range of the facial features, and the situation of the mis-judgement cannot occur.

Figure 4:
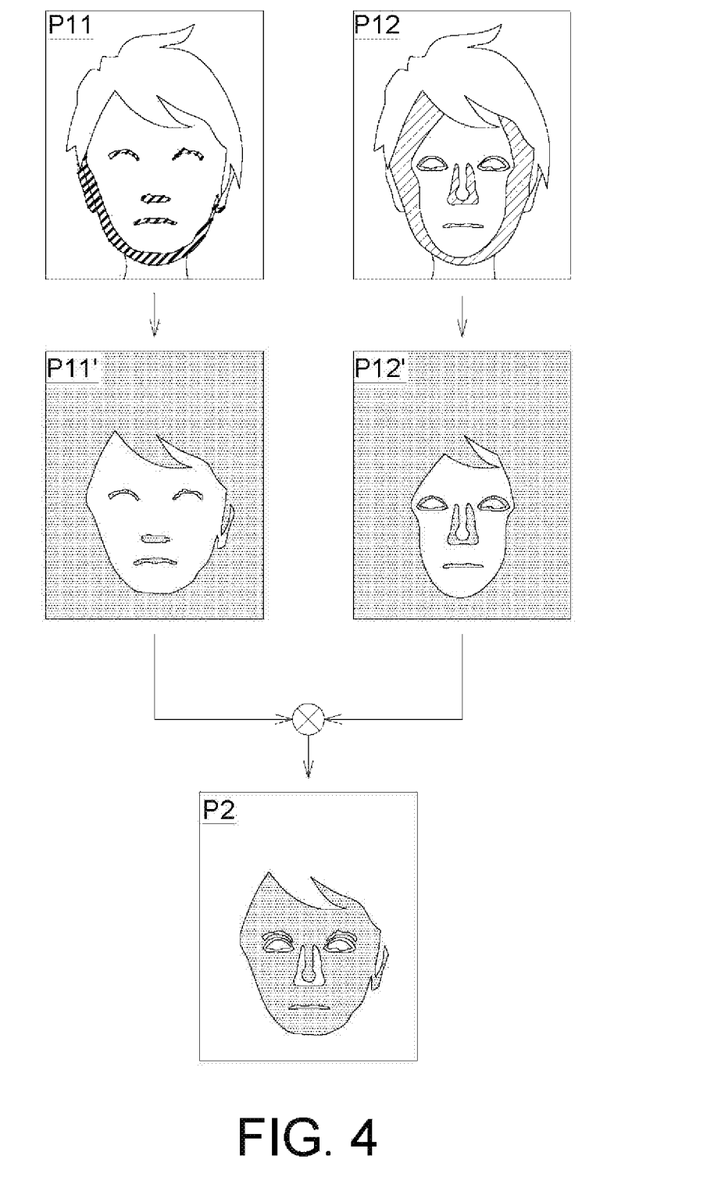
FIG. 4 is a schematic view showing a step S120.

FIG. 4 is a schematic view showing the step S120. Referring next to FIG. 4, the processor 110 superimposes the facial shadow pictures P11 and P12 to generate a composite shadow picture P2.

In the step S120, the processor 110 firstly performs shadow point enhancement on the facial shadow pictures P11 and P12 to generate enhanced facial shadow pictures P11' and P12'. For example, the shadow point enhancement is to perform the process of binarization, background removal or noise removal on the facial shadow pictures P11 and P12. Next, the processor 110 superimposes the enhanced facial shadow pictures P11' and P12' again to obtain the composite shadow picture P2.

It can be obtained from FIG. 4 that the facial shadow picture P11 obtained by the single projecting location does not apparently render the complete facial features, but the composite shadow picture P2 obtained by the multiple projecting locations can apparently render the complete facial features.

Figure 5:
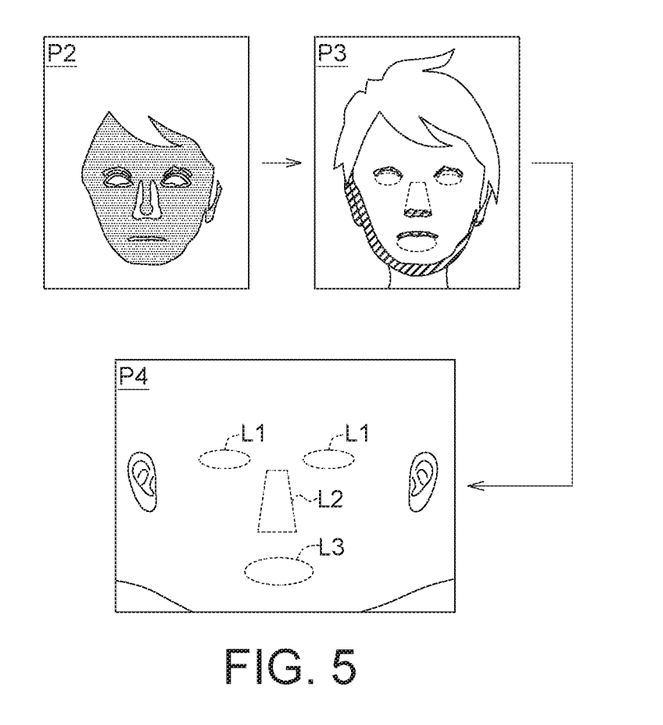
FIG. 5 is a schematic view showing a step S130.

FIG. 5 is a schematic view showing the step S130. Referring to FIG. 5, in the step S130, the processor 110 obtains a contour boundary pattern P3 of the composite shadow picture P2 according to the composite shadow picture P2. In this step, the boundary search algorithm is, for example, used to analyze the contour boundary pattern P3. A 2D facial map P4 is obtained from the contour boundary pattern P3. Then, the processor 110 analyzes the 2D facial map P4 to obtain an eye-eyebrow location L1, a nose location L2 and a mouth location L3 in the 2D facial map P4 according to the contour boundary pattern P3. In this embodiment, the 2D facial map P4 corresponds to a front side angle of a 3D facial map P9 (shown in FIG. 9). In an embodiment, the angle corresponding to the 2D facial map P4 only needs to be consistent with the angle captured by the 3D model 300, and the accurate eye-eyebrow location L1, nose location L2 and mouth location L3 in the 2D facial map P4 can be analyzed smoothly.

Figure 6:
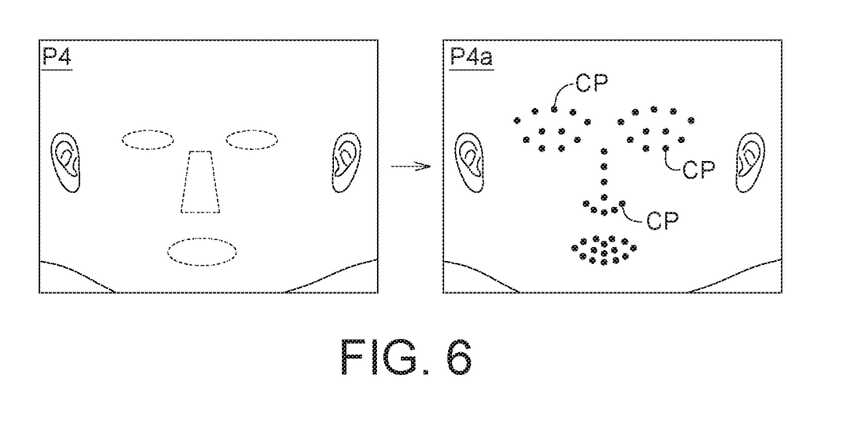
FIG. 6 is a schematic view showing a step S140.

FIG. 6 is a schematic view showing the step S140. Referring to FIG. 6, in the step S140, the processor 110 calculates a plurality of characteristic points CP according to the eye-eyebrow location L1, the nose location L2 and the mouth location L3 in the 2D facial map P4. The 2D facial map P4a shows the plurality of characteristic points CP. In an embodiment, the processor 110 calculates the characteristic points CP by way of uniform distribution. For example, the number of the characteristic points CP corresponding to the eye-eyebrow location L1 may be equal to 22, the number of the characteristic points CP corresponding to the nose location L2 may be equal to 9, and the number of the characteristic points CP corresponding to the mouth location L3 may be equal to 19.

After the step S140 is finished, the plurality of characteristic points CP of the 2D facial map P4a are obtained, and various image processing procedures including, for example, a procedure for synthesizing pictures into a 3D facial model (i.e., steps S150 to S190) are performed according to these characteristic points CP.

Figure 7:
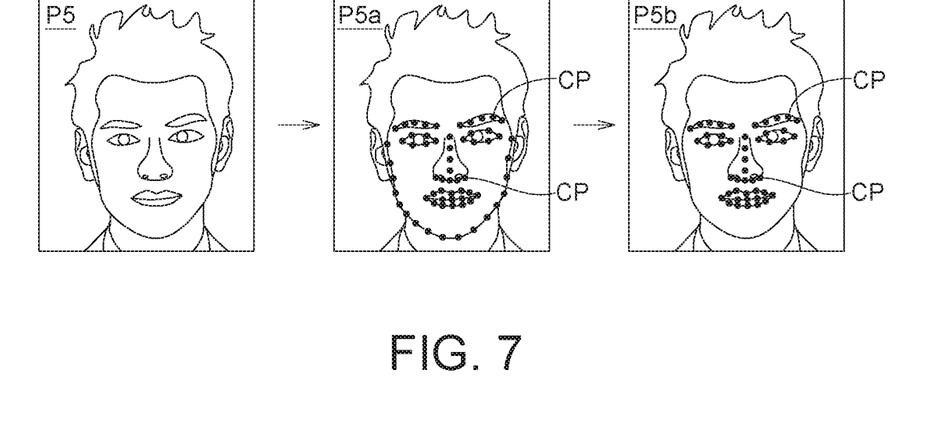
FIG. 7 is a schematic view showing a step S150.

FIG. 7 is a schematic view showing the step S150. Referring to FIG. 7, in the step S150, the processor 110 marks the characteristic points CP on a human face picture P5. In this step, the processor 110 can firstly mark the characteristic points CP containing a jowl on the human face picture P5 to obtain the human face picture P5a, and then filter out the characteristic points CP corresponding to the eye-eyebrow location L1, the nose location L2 and the mouth location L3 to obtain the human face picture P5b.

Figure 8:
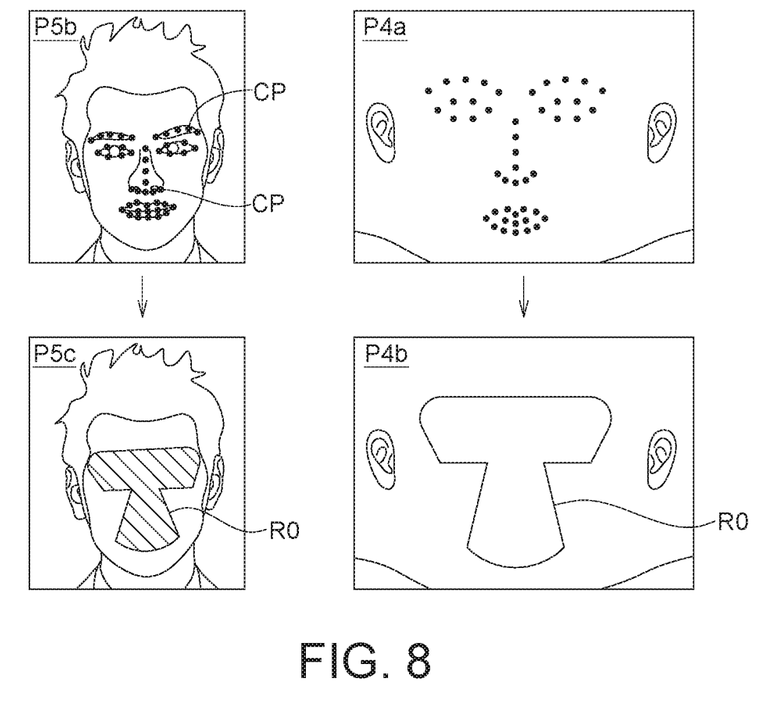
FIG. 8 is a schematic view showing a step S160.

FIG. 8 is a schematic view showing the step S160. Referring next to FIG. 8, in the step S160, the processor 110 extracts a shape range R0 from the human face picture P5b according to the characteristic points CP. The human face picture P5c shows the shape range R0. The shape range R0 is formed by the characteristic points CP corresponding to the eye-eyebrow location L1, the nose location L2 and the mouth location L3. The shape range R0 covers several most important organs of the human face.

Figure 9:
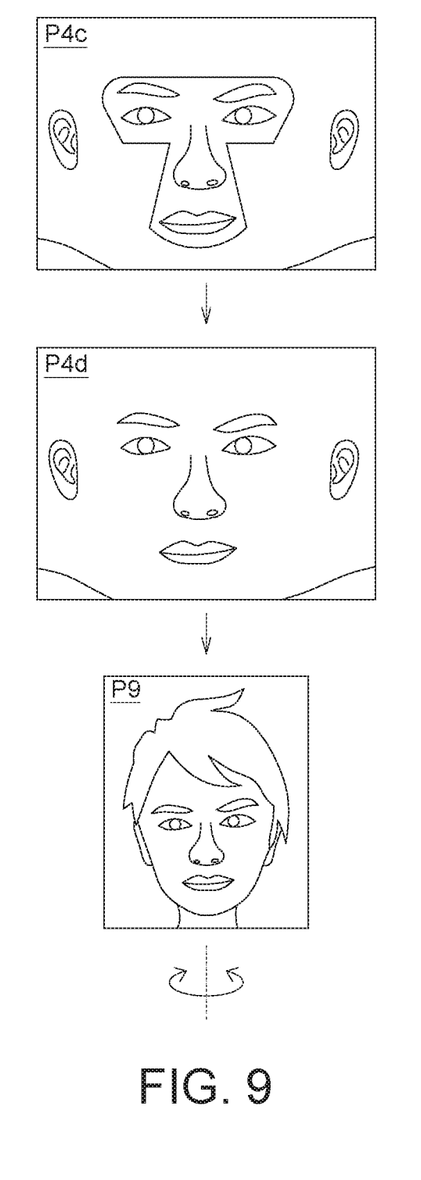
FIG. 9 is a schematic view showing steps S170 to S190.

FIG. 9 is a schematic view showing the steps S170 to S190. Referring to FIG. 9, in the step S170, the processor 110 maps the shape range R0 to the 2D facial map P4b to obtain the 2D facial map P4c. That is, the image of the human face picture P5c corresponding to the shape range R0 are mapped to the shape range R0 of the 2D facial map P4b.

Next, in the step S180, the processor 110 performs a skin color equalization procedure on the 2D facial map P4c to obtain the 2D facial map P4d, so that the skin color inside the shape range R0 approximates to the skin color outside the shape range R0.

Then, in the step S190, the processor 110 synthesizes the 2D facial map P4d into the 3D facial map P9. In one embodiment, the 3D facial map P9 is obtained from the 3D model 300.

The human face picture P5 can be synthesized into the 3D facial map P9 through the above-mentioned steps. Different facial shadow pictures P11 and P12 are generated by using the different projecting locations A1 and A2 in the above-mentioned embodiment, so that the facial characteristic points CP are calculated automatically. The precision of selecting the characteristic points CP is improved, and the image processing speed is also increased.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
projecting a light source onto a 3D model via a plurality of projecting locations to generate a plurality of facial shadow pictures, wherein the projecting locations are the locations of the light source;
superimposing the facial shadow pictures to generate a composite shadow picture;
analyzing a 2D facial map to obtain an eye-eyebrow location, a nose location and a mouth location in the 2D facial map according to a contour boundary pattern, where the 2D facial map is obtained from the contour boundary pattern; and calculating a plurality of characteristic points in the 2D facial map according to the eye-eyebrow location, the nose location and the mouth location in the 2D facial map;

wherein the step of superimposing the facial shadow pictures to generate the composite shadow picture comprises:

performing shadow point enhancement on the facial shadow pictures; and superimposing the enhanced facial shadow pictures to obtain the composite shadow picture.

2. The image processing method according to claim 1, wherein in the step of projecting the light source onto the 3D model via the projecting locations to generate the facial shadow pictures, the projecting locations are an upper front, a lower front, a front left or a front right of the 3D model.

3. The image processing method according to claim 1, wherein the projecting locations comprise an upper front at an angle of 45 degrees and a lower front at an angle of 15 degrees, the angle is determined by an imaginary line and an imaginary horizontal plane, the imaginary line passes through the light source and the 3D model, and the imaginary horizontal plane is parallel to the ground and passes through the 3D model.

4. The image processing method according to claim 1, wherein the step of analyzing the 2D facial map to obtain the eye-eyebrow location, the nose location and the mouth location in the 2D facial map according to the contour boundary pattern comprises:

obtaining the contour boundary pattern of the composite shadow picture; and analyzing the eye-eyebrow location, the nose location and the mouth location in the 2D facial map according to the contour boundary pattern.

5. The image processing method according to claim 1, wherein the step of calculating the characteristic points in the 2D facial map according to the eye-eyebrow location, the nose location and the mouth location in the 2D facial map calculates the characteristic points by way of uniform distribution.

6. The image processing method according to claim 1, wherein in the step of calculating the characteristic points in the 2D facial map according to the eye-eyebrow location, the nose location and the mouth location in the 2D facial map, a number of the characteristic points corresponding to the eye-eyebrow location is equal to 22, a number of the characteristic points corresponding to the nose location is equal to 9, and a number of the characteristic points corresponding to the mouth location is equal to 19.

7. The image processing method according to claim 1, further comprising:

marking the characteristic points on a human face picture;

extracting a shape range according to the characteristic points on the human face picture;

mapping the shape range to the 2D facial map;

performing a skin color equalization procedure on the 2D facial map; and synthesizing the 2D facial map into a 3D facial map, wherein the 3D facial map is obtained from the 3D model.

8. The image processing method according to claim 1, wherein the 2D facial map corresponds to a front side angle of a 3D facial map.

9. The image processing method according to claim 1, wherein the 3D model is a 3D human facial model or a real person.

10. An image processing device, comprising a processor for performing an image processing method, the image processing method comprising:

superimposing a plurality of facial shadow pictures to generate a composite shadow picture, wherein the facial shadow pictures are generating by projecting a light source onto a 3D model via a plurality of projecting locations, wherein the projecting locations are the locations of the light source;

analyzing a 2D facial map to obtain an eye-eyebrow location, a nose location and a mouth location in the 2D facial map according to a contour boundary pattern, where the 2D facial map is obtained from the contour boundary pattern; and calculating a plurality of characteristic points in the 2D facial map according to the eye-eyebrow location, the nose location and the mouth location in the 2D facial map;

wherein the step of superimposing the facial shadow pictures to generate the composite shadow picture comprises:

performing shadow point enhancement on the facial shadow pictures; and superimposing the enhanced facial shadow pictures to obtain the composite shadow picture.

11. The image processing device according to claim 10, wherein the projecting locations are an upper front, a lower front, a front left or a front right of the 3D model.

12. The image processing device according to claim 10, wherein the projecting locations comprise an upper front at an angle of 45 degrees and a lower front at an angle of 15 degrees, the angle is determined by an imaginary line and an imaginary horizontal plane, the imaginary line passes through the light source and the 3D model, and the imaginary horizontal plane is parallel to the ground and passes through the 3D model.

13. The image processing device according to claim 10, wherein the step of analyzing the 2D facial map to obtain the eye-eyebrow location, the nose location and the mouth location in the 2D facial map according to the contour boundary pattern comprises:

obtaining the contour boundary pattern of the composite shadow picture; and analyzing the eye-eyebrow location, the nose location and the mouth location in the 2D facial map according to the contour boundary pattern.

14. The image processing device according to claim 10, wherein the step of calculating the characteristic points in the 2D facial map according to the eye-eyebrow location, the nose location and the mouth location in the 2D facial map calculates the characteristic points by way of uniform distribution.

15. The image processing device according to claim 10, wherein in the step of calculating the characteristic points in the 2D facial map according to the eye-eyebrow location, the nose location and the mouth location in the 2D facial map, a number of the characteristic points corresponding to the eye-eyebrow location is equal to 22, a number of the characteristic points corresponding to the nose location is equal to 9, and a number of the characteristic points corresponding to the mouth location is equal to 19.

16. The image processing device according to claim 10, further comprises:

marking the characteristic points on a human face picture;

extracting a shape range according to the characteristic points on the human face picture;
mapping the shape range to the 2D facial map;
performing a skin color equalization procedure on the 2D facial map; and
synthesizing the 2D facial map into a 3D facial map, wherein the 3D facial map is obtained from the 3D model.

17. The image processing device according to claim 10, wherein the 2D facial map corresponds to a front side angle of a 3D facial map.

18. The image processing device according to claim 10, wherein the 3D model is a 3D human facial model or a real person.

\* \* \* \* \*